US010180174B2

United States Patent
Murata et al.

(10) Patent No.: US 10,180,174 B2
(45) Date of Patent: Jan. 15, 2019

(54) FLUCTUATION ATTENUATOR

(71) Applicant: HONDA MOTOR CO., LTD., Tokyo (JP)

(72) Inventors: Toshiki Murata, Wako (JP); Yoshinori Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/343,774

(22) Filed: Nov. 4, 2016

(65) Prior Publication Data
US 2017/0122402 A1    May 4, 2017

(30) Foreign Application Priority Data

Nov. 4, 2015    (JP) .................................. 2015-216658

(51) Int. Cl.
*F16F 15/121* (2006.01)
*F16F 15/123* (2006.01)

(52) U.S. Cl.
CPC .... *F16F 15/1232* (2013.01); *F16F 15/12326* (2013.01)

(58) Field of Classification Search
CPC .......................... F16F 15/1232; F16F 15/12326
USPC ................. 464/68.92; 192/205; 267/178, 179
See application file for complete search history.

(56) References Cited

U.S. PATENT DOCUMENTS

| 4,537,298 A | * | 8/1985 | Loizeau ................ F16D 13/686 192/205 X |
| 7,297,064 B2 | * | 11/2007 | Jackel ....................... F16F 1/08 464/68.92 X |
| 8,057,311 B2 | * | 11/2011 | Boelling ............. F16F 15/1234 464/68.92 |

FOREIGN PATENT DOCUMENTS

| CN | 1374466 A | 10/2002 |
| JP | 2002-310238 A | 10/2002 |
| JP | 2015-86965 A | 5/2015 |

OTHER PUBLICATIONS

Office Action dated Nov. 14, 2017, issued in counterpart Japanese Application No. 2015-216658, with English machine translation. (6 pages).

* cited by examiner

*Primary Examiner* — Greg Binda
(74) *Attorney, Agent, or Firm* — Westerman, Hattori, Daniels & Adrian, LLP

(57) ABSTRACT

A fluctuation attenuator has: a first flywheel 2 connected to an internal combustion engine ENG; a housing portion 7; a second flywheel 3 connected a transmission TM; a plurality of end portion sheets 10 inserted into the housing portion 7; and a coil spring 8 held on the end portion sheet 10. The end portion sheet 10 has an inserting hole 10*a* into which the coil spring 8 inserted, and a notched portion 10*b* into which a projecting piece 12*a* of the second flywheel 3 is inserted and with which the inserting hole 10*a* is communicated, and which exposes the end portion of the coil spring 8. A notched portion 10*b* is notched such that the projecting piece 12*a* contacts the end portion sheet 10 after contacting the coil spring 8 when the projecting piece 12*a* contacts the end portion sheet 10.

3 Claims, 4 Drawing Sheets

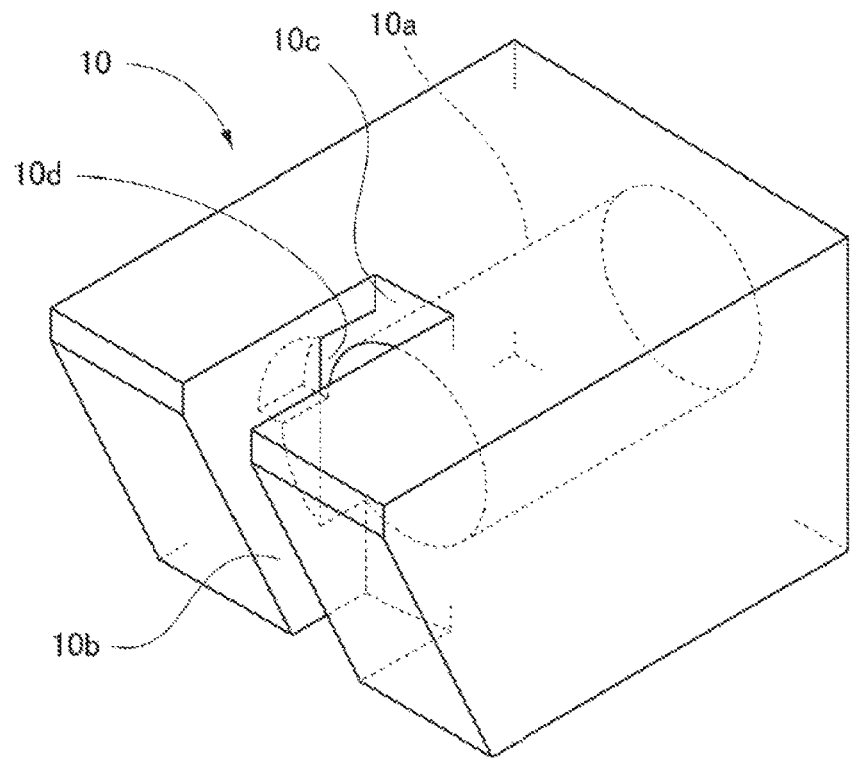
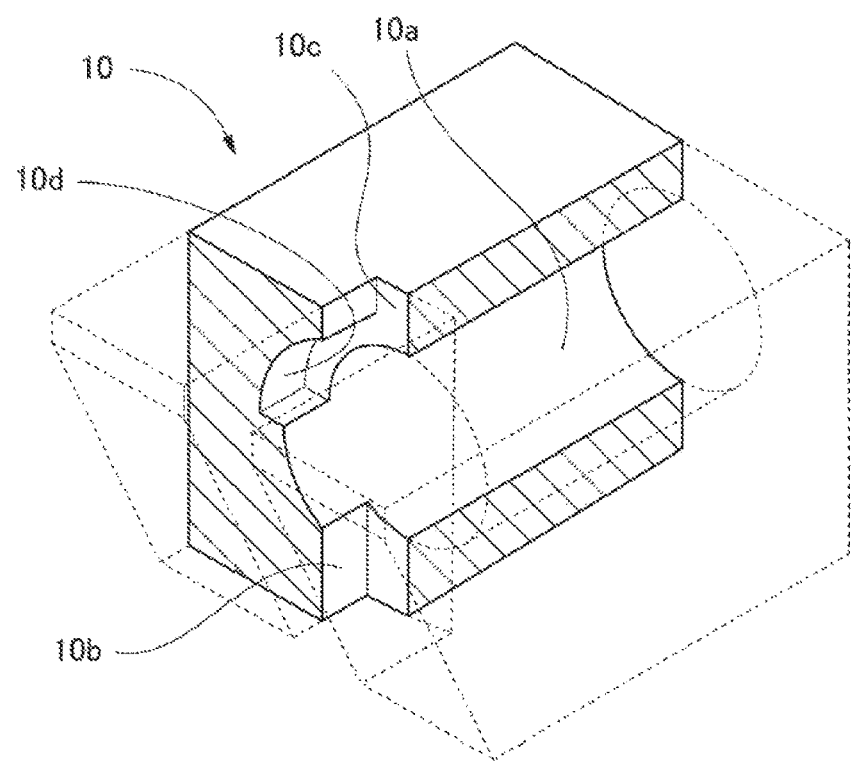

FLUCTUATION ATTENUATOR

CROSS-REFERENCE OF RELATED APPLICATION

This application claims priority of Japanese Patent Application No. 2015-216658 filed in Japan on Nov. 4, 2015, the entire contents of which are incorporated herein by reference.

TECHNICAL FIELD

The present invention relates to a fluctuation attenuator attenuating the fluctuation of the driving force which is transmitted between a motor and a power transmission device.

BACKGROUND OF THE INVENTION

There is an conventionally known fluctuation attenuator which transmits the driving force output from the internal combustion engine to a transmission, and simultaneously, attenuates the fluctuation of the driving force of the internal combustion engine (for example, see Japanese Laid-open Patent Publication No. 2015-86965).

The fluctuation attenuator has a first flywheel connected to an internal combustion engine, a housing portion provided on the first flywheel, a second flywheel connected to the transmission so as to enable the relative angular displacement around the same axis relative to the first flywheel, a plurality of spring sheets inserted into the housing portion so as to be slidable to the circumferential direction, and a coil spring held on the spring sheet such that the both ends of the coil spring contact on the spring sheet in a non-transmission state. An inserting hole into which the coil spring is inserted is provided on the spring sheet.

SUMMARY OF THE INVENTION

In the conventional fluctuation attenuator, there are cases where a supporting member(s) such as a spring sheet is stuck to the inner wall of the housing portion provided on a first rotor of the first flywheel and the like at the time of high-speed rotation, and the supporting member cannot follow a second rotor. Then, the stuck supporting member may collide with the second rotor. When the stuck supporting member collides with the second rotor, a motor detects the large fluctuation of angular acceleration, and may misdetect as an accidental fire including an ignition failure of the motor.

The present invention takes the above-mentioned point into the consideration, and aims to provide a fluctuation attenuator which can suppress the fluctuation of angular acceleration when a rotor collides with a supporting member.

In order to achieve the above-mentioned goal,
in a fluctuation attenuator which transmits a driving force output from a motor to a power transmission device, with a damping function simultaneously attenuating the fluctuation of the driving force of the motor,
the present invention is characterized in that a fluctuation attenuator has:
a first rotor connected to each one side of the motor and the power transmission device;
a housing portion provided on the first rotor on an arc around the rotation axis line of the first rotor;
a second rotor connected to each other side of the motor and the power transmission device so as to enable the relative angular displacement around the same axis relative to the first rotor;
a plurality of supporting bodies inserted into the housing portion so as to be slidable to the circumferential direction;
and an elastic body held on the supporting member so as to contact the end of the elastic body on the supporting member in a non-transmission state,
the supporting member is equipped with:
an inserting hole into which the elastic body is inserted;
and a notched (cutout) portion into which the second rotor is inserted and with which the inserting hole is communicated and which exposes at least a part of the elastic body,
and the notched portion is notched such that the second rotor contacts the supporting member after contacting the elastic body when the second rotor contacts the supporting member.

According to the present invention, the end portion of the elastic body is exposed from the notched portion. Accordingly, even if the supporting member is stuck to a first rotor at the time of high-speed rotation, a differential rotation between the first rotor and the second rotor becomes larger, and the supporting member cannot follow the relative movement of the second rotor so as to be separated from the supporting member, the exposed end portion of the elastic body can follow the second rotor. According to the present invention, the torque fluctuation transmitted between the first rotor and the second rotor can be attenuated.

Moreover, the second rotor contacts the end portion of the elastic body before abutting on the notched portion. Due to the cushioning function of the end portion of the elastic body, the impact when the second rotor contact the supporting member can be absorbed. Accordingly, it is possible to suppress the relatively larger fluctuation of the angular acceleration of the motor.

Moreover, in the present invention, a clearance portion is provided on the supporting member so as to recess to the outside in the radial direction behind the inserting hole. The clearance portion is separated from the elastic body. It is preferable to prevent the clearance portion from contacting with the elastic body. If the supporting member is stuck to the first rotor due to the centrifugal force, the elastic body may also be stuck to the supporting member due to the centrifugal force. Then, if the elastic body is stuck to the supporting member, the end portion of the elastic body may contact to the supporting member. Then, as above mentioned, if the clearance portion is provided on the supporting member so as to recess the outward in the radial direction behind the inserting hole and separated so as to prevent the clearance from contacting with the elastic body, it is possible to prevent the elastic body from contacting with the supporting member at the portion which is exposed by the notched portion, and to prevent the reduction of the cushioning function due to sticking of the elastic body

BRIEF DESCRIPTION OF THE DRAWINGS

FIG. 3A is a perspective view of the supporting member, which is schematically shown. FIG. 3B is a perspective view of the supporting member, which is schematically shown in a cross section.

DETAILED DESCRIPTION OF THE INVENTION

Figure 1:
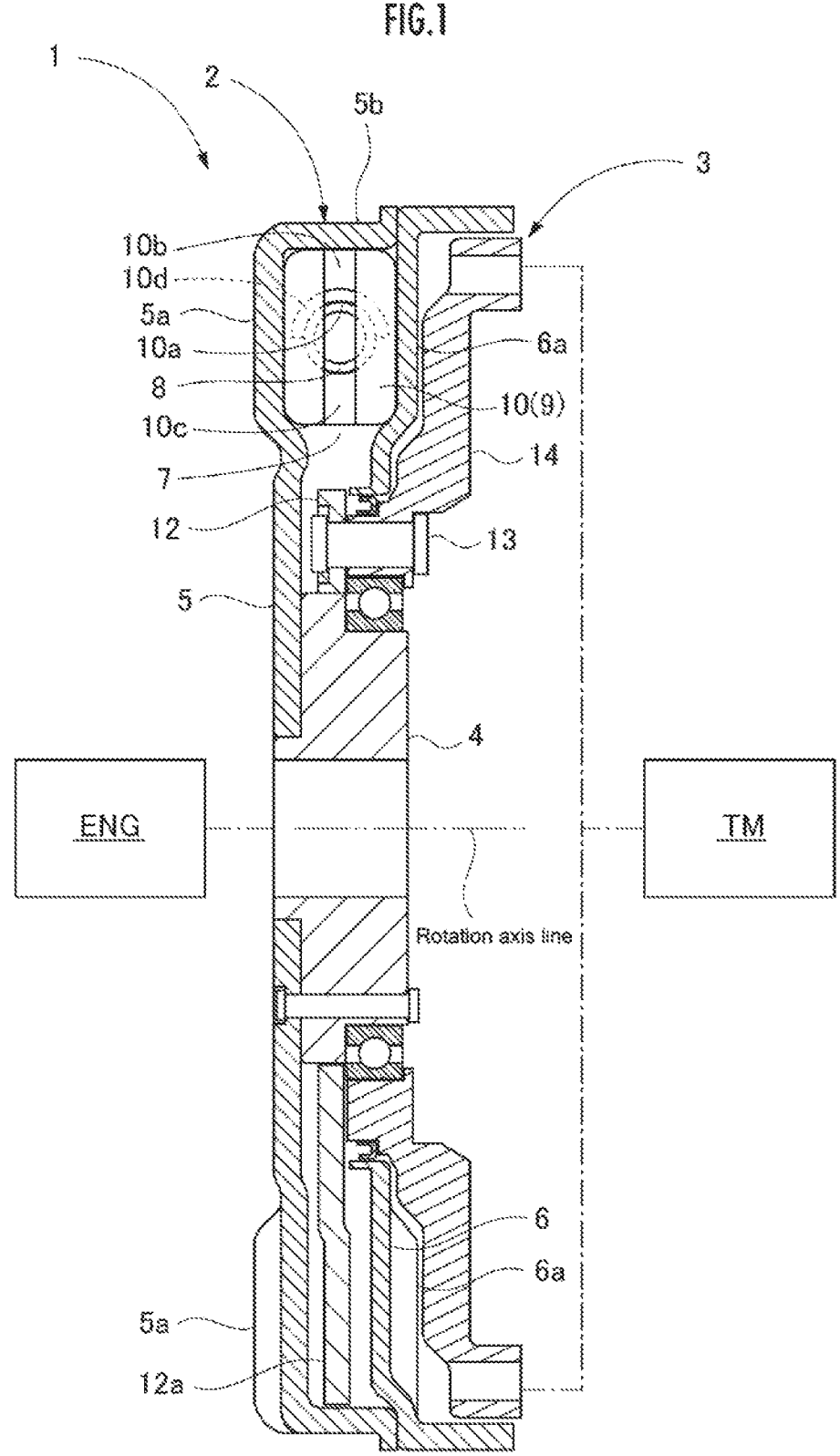
FIG. 1 is a sectional view of the fluctuation attenuator in the present embodiment, which as shown in the radial direction.
Figure 2:
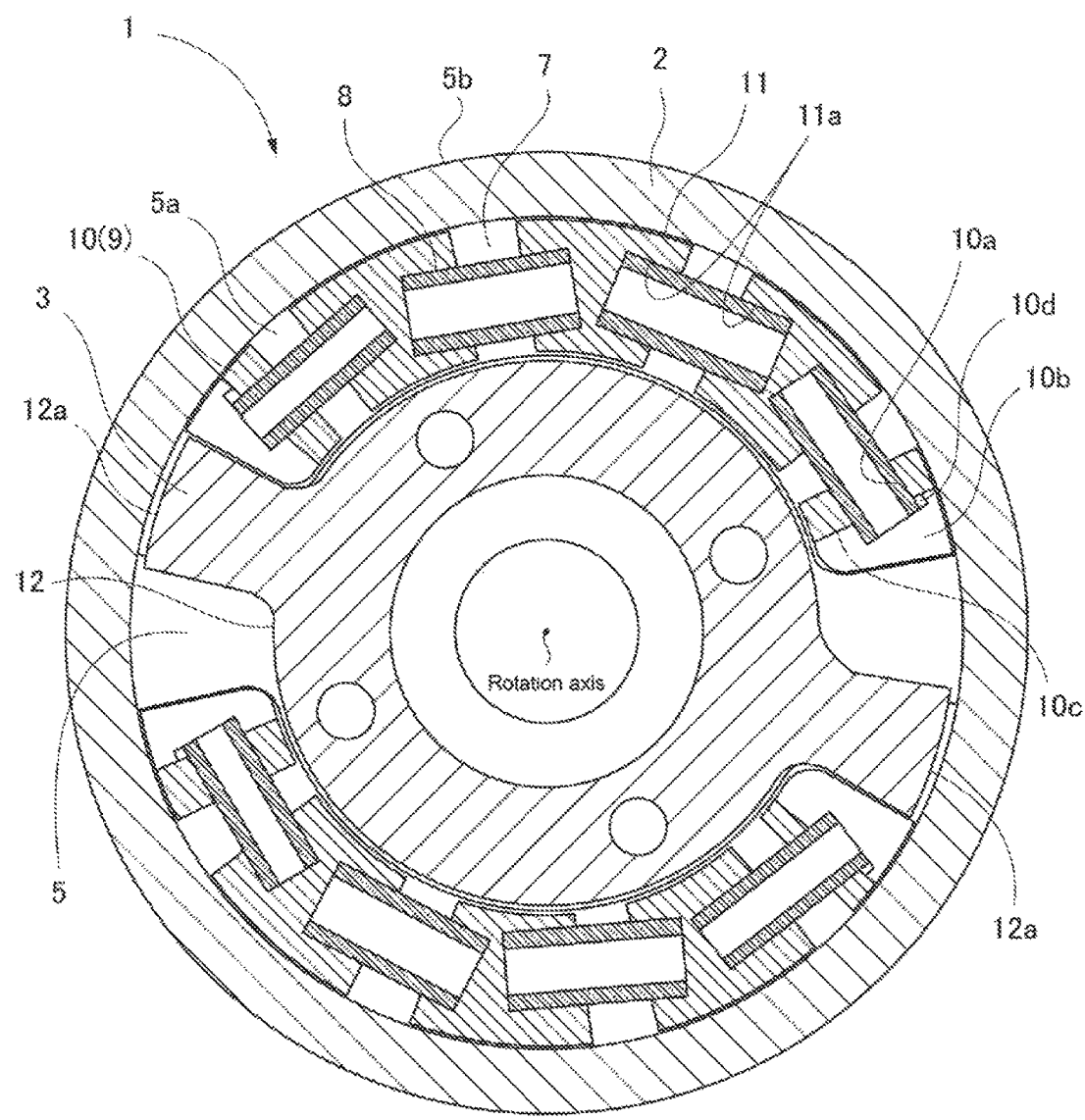
FIG. 2 is a sectional view of the embodiment of the fluctuation attenuator in the present invention, which is shown in the rotational axis direction.

A fluctuation attenuator in the embodiment of the present invention is a dual mass flywheel 1 which is a kind of variable capacity flywheel. As shown in FIG. 1 and FIG. 2, the dual mass flywheel 1 has a first flywheel 2 as a first rotor connected to a crank shaft of an internal combustion engine ENG as a motor, a second flywheel 3 as a second rotor connected to an input shaft of a transmission TM as a power transmission device, and the first flywheel 2 as the second rotor which enables the relative angular displacement with the first flywheel 2 around the same axis line relative to the first flywheel.

The first flywheel 2 has an shaft body 4 connected to the crank shaft of the internal combustion engine ENG, a disc-shaped first plate 5 fixed on the shaft body 4, and a disc-shaped second plate 6 disposed on the same axis with the first plate 5 so as to be further separated from an internal combustion engine ENG than the first plate 5.

A pair of first recessed portions 5a recessed to the internal combustion engine ENG side are provided on the outside portion of the first plate 5 in the radial direction at equal intervals in the circumferential direction. Moreover, a cylindrical portion 5b extending to the outer peripheral edge of the second plate 6 is provided on the outer peripheral edge of the first plate 5. The cylindrical portion 5b is connected to the outer peripheral edge of the second plate 6.

A pair of second recessed portions 6a recessed to the transmission TM side are provided on the outside portion of the second plate 6 in the radial direction at equal intervals in the circumferential direction. The second recessed portion 6a is disposed so as to correspond to the first recessed portion 5a. A pair of housing portions 7 in the present embodiment are formed with the first recessed portion 5a and the second recessed portion 6a.

Four coil springs 8 as the elastic body are housed in series to the circumferential direction on the pair of housing portions 7, respectively. A spring sheet 9 as the supporting member is disposed on the end portion of the circumferential direction of the coil spring 8. The spring sheet 9 comprises an end portion sheet 10 positioned at the end of the housing portion 7 in the circumferential direction, and a middle sheet 11 disposed between the coil springs 8 arranged in the circumferential direction.

As shown in FIG. 3A and FIG. 3B, an inserting hole 10a into which the end portion of the coil spring 8 is inserted is formed on the end portion sheet 10. Moreover, and a notched portion 10b is formed on the end portion sheet 10, into which a part of the second flywheel 3 can be inserted and with which the inserting hole 10a is communicated.

The end portion of the notched portion 10b in the circumferential direction is formed as an abutting surface 10c on which a part of the second flywheel 3 can be abutted. The width of the notch portion 10b in the rotational axis direction is set narrower than the width of the inserting hole 10a in the rotational axis direction. Accordingly, the bottom of the inserting hole 10a can still remain without losing the whole bottom by communicating with the notched portion 10b. Due to the fact that the remaining portion of bottom engages the coil spring 8, the coil spring 8 can be prevented from being detached from the end portion sheet 10 to the circumferential direction.

Moreover, a clearance portion 10d is provided on the outside in the radial direction behind the inserting hole 10a so as to be recessed to the outside in the radial direction and separated from the coil spring 8. The clearance portion 10d is formed so as to correspond to the area where the inserting hole 10a and the notched portion 10b are overlapped.

A pair of receiving portions 11a receiving the end portion of the adjacent coil spring 8 from the circumferential direction are provided on the middle sheet 11.

The second flywheel 3 comprises a disc-shaped and annular transmission plate 12, a flywheel main body 14 fixed with a rivet 13 on the transmission plate 12. A projecting piece 12a is provided on the outer peripheral edge of the transmission plate 12 so as to be positioned between each circumferential direction of the pair of housing portions 7 and to be projected to the outward in the radial direction. The projecting piece 12a is inserted into the notched portion 10b so as to form the portion abutting on an abutting surface 10c. A flywheel main body 14 is connected to the input axis of the transmission TM.

Next, with reference to FIG. 4, the operation of the dual mass flywheel 1 in the present embodiment will be explained.

The dual mass flywheel 1 in the present embodiment keeps the state that the projecting piece 12a and the end portion sheet 10 or the coil spring 8 are contacting, even if the torsion force fluctuates between the first flywheel 2 and the second flywheel 3 at the normal time. However, the dual mass flywheel 1 in the present embodiment has some cases that the end portion sheet 10 may be stuck to the inside of the cylindrical portion 5b of the first flywheel 2 due to the centrifugal force at the time of high-speed rotation.

Conventional dual mass flywheels have some cases that the end portion sheet and the projecting piece may be separated when the end portion sheet is stuck to the cylindrical portion due to the centrifugal force. If the projecting piece is separated from the end portion sheet, an angular acceleration suddenly fluctuates when the projecting piece abuts on the end portion sheet again. The internal combustion engine may misdetect the fluctuation as an accidental fire due to an ignition failure.

Figure 4A:
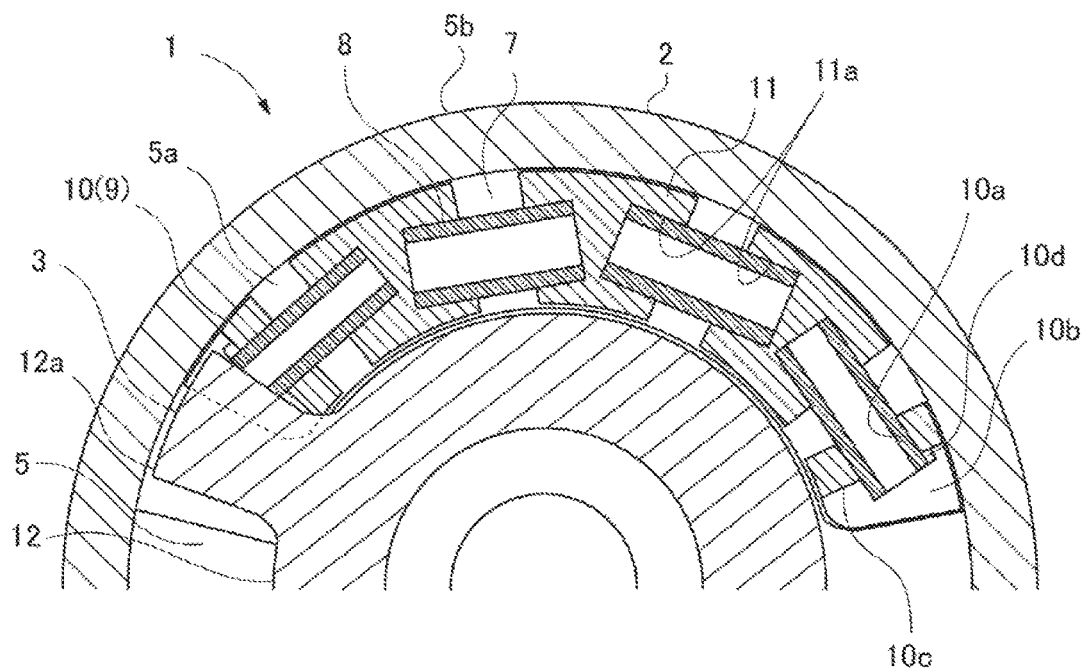
FIG. 4A is an explanatory drawing showing a state that the second rotor in the present embodiment contacts with the elastic body.

In the dual mass flywheel 1 in the present embodiment, even if the end portion sheet 10 is stuck to the inside of the cylindrical portion 5b of the first flywheel 2 due to the centrifugal force at the time of high-speed rotation, and a differential rotation between the first flywheel 2 and the second flywheel 3 becomes larger, and the end portion sheet 10 cannot follow the relative movement of the second flywheel 3, which is separating from the end portion sheet 10, as shown in FIG. 4A, the exposed end portion of the coil spring 8 can follow the projecting piece 12a of the second flywheel 3. According to the present invention, the torque fluctuation transmitted between the first flywheel 2 and the second flywheel 3 can be attenuated.

Figure 4B:
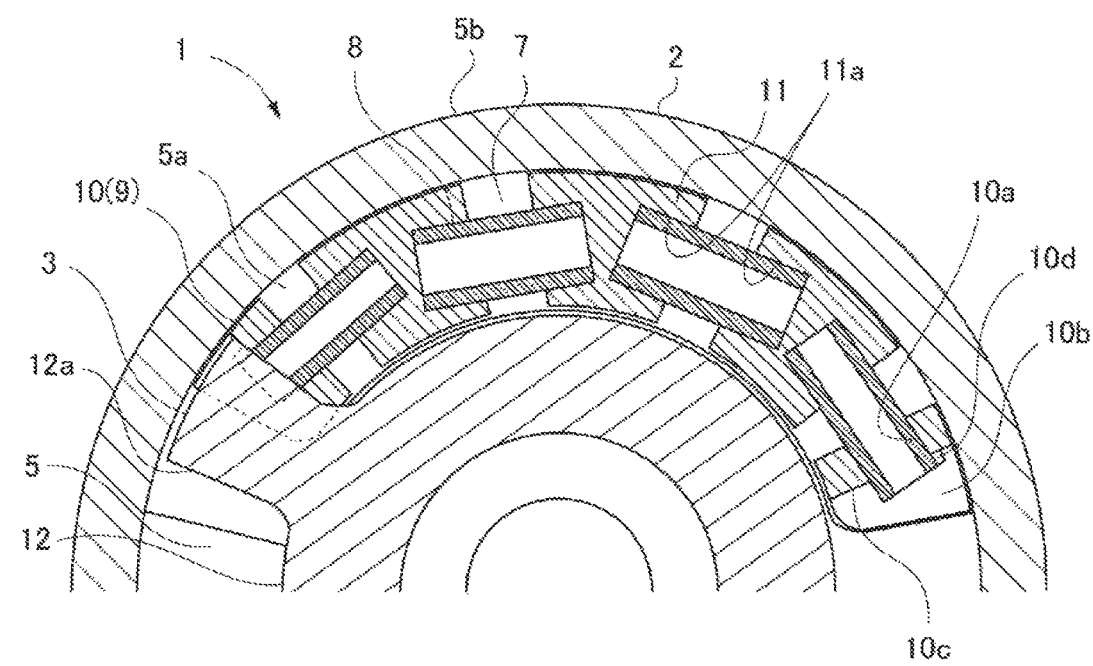
FIG. 4B is an explanatory drawing showing a state that the second rotor in the present embodiment contacts with the supporting member.

Moreover, as shown in FIG. 4A, the projecting piece 12a contacts the coil spring 8 exposed from the notched portion 10b before contacting the abutting surface 10c of the end portion sheet 10. Then, as shown in FIG. 4B the projecting piece 12a contacts the abutting surface 10c while pushing and contracting the coil spring 8. Accordingly, due to the cushioning function of the end portion of the coil spring 8 when the projecting piece 12a contacts the abutting surface 10c, a sudden fluctuation of angular acceleration can be suppressed, which allows to prevent the misdetection of an accidental fire.

Moreover, due to the fact that the notched portion 10b exposes the coil spring 8, the component number can be reduced more in comparison to the case that a cushioning member for cushioning is separately provided on the end portion sheet 10, which allows to simplify the assembly process of the dual mass flywheel 1.

Moreover, when the end portion sheet 10 is stuck to the cylindrical portion 5b due to the centrifugal force, the coil spring 8 is also pressed to the end portion sheet 10 due to the centrifugal force. If the end portion of the coil spring 8 is stuck to the end portion sheet 10, the cushioning function when the projecting piece 12a contacts the abutting surface 10c may be reduced.

Therefore, in the dual mass flywheel 1 in the present embodiment, the clearance portion 10d is provided so as to be separated from the end portion of the coil spring 8, which prevents the end portion of the coil spring 8 exposed from the notched portion 10b from sticking to the end portion sheet 10 inside the inserting hole 10a. Accordingly reducing the cushioning function of end portion of the coil spring can be prevented.

Moreover, even though the present embodiment explains the coil spring 8 as the elastic body, the elastic body in the present invention is not limited to coil spring.

Moreover, even though the present embodiment explains the dual mass flywheel 1 as the fluctuation attenuator, the fluctuation attenuator in the present invention is not limited to dual mass flywheel.

Moreover, the present embodiment explains the first flywheel 2 as the first rotor connected to the internal combustion engine ENG as the motor, and the second flywheel 3 as the second rotor connected to the transmission TM as the power transmission device. The function and effect in the present invention can be achieved even if the first flywheel 2 as the first rotor is connected to the transmission TM as the power transmission device, and the second flywheel 3 of the second rotor is connected to the internal combustion engine ENG as the motor, in the present invention.

DESCRIPTION OF REFERENCE NUMERALS 1 dual mass flywheel (fluctuation attenuator)
2 first flywheel (first rotor)
3 second flywheel (second rotor)
4 shaft body
5 first plate
5a first recessed portion
5b cylindrical portion
6 second plate
6a second recessed portion
7 housing portion
coil spring (elastic body)
9 spring sheet
10 end portion sheet (supporting member)
10a inserting hole
10b notched portion
10c abutting surface
10d clearance portion
11 middle sheet
12 transmission plate
12a projecting piece
13 rivet
14 flywheel main body
ENG internal combustion engine (motor)
TM transmission (power transmission device)

The invention claimed is:

1. A fluctuation attenuator configured to transmit a driving force output from a motor to a power transmission device while attenuating a fluctuation of the driving force of the motor, the fluctuation attenuator comprising:
   a first rotor connected to one of said motor and said power transmission device;
   a housing portion provided in said first rotor and extending in a shape of an arc around a rotation axis line of said first rotor and along a circumferential direction of said first rotor;
   a second rotor connected to the other of said motor and said power transmission device and axially aligned with the first rotor so as to rotate with the first rotor while enabling a relative angular displacement relative to said first rotor;
   a plurality of supporting members inserted into said housing portion so as to be slidable along the circumferential direction of said first rotor, at least one of the supporting members being configured to contact the second rotor in the circumferential direction;
   an elastic body held in inserting holes of said supporting members and having ends in the circumferential direction such that each end of said elastic body contacts said supporting members in a non-transmission state, wherein
   at least one of said supporting members has a cutout portion which allows at least a part of at least one end of elastic body to expose such that said second rotor first contacts said exposed part of said at least one end of said elastic body and then contacts said at least one of the supporting members, and
   said at least one of said supporting members has a clearance portion which recesses outward in the radial direction from said inserting hole so as to be located away from said elastic body such that said clearance portion does not contact said elastic body.

2. The fluctuation attenuator according to claim 1, wherein
   said clearance portion is formed in a position corresponding to an area where the inserting hole and said cutout portion are overlapped.

3. The fluctuation attenuator according to claim 1, wherein
   a width of said cutout portion in a rotational axis direction of said first and second rotors is narrower than a width of the inserting hole of said at least one of said supporting members in said rotational axis direction, and
   said cutout portion is formed from an inner end to an outer end of said at least one of said supporting members in a radial direction with respect to said rotational axis direction.

* * * * *